(12) United States Patent
Allard et al.

(10) Patent No.: US 10,365,030 B2
(45) Date of Patent: *Jul. 30, 2019

(54) 3D VACUUM PANEL AND A FOLDING APPROACH TO CREATE THE 3D VACUUM PANEL FROM A 2D VACUUM PANEL OF NON-UNIFORM THICKNESS

(71) Applicant: WHIRLPOOL CORPORATION, Benton Harbor, MI (US)

(72) Inventors: Paul B. Allard, Coloma, MI (US); Andrea Olivani, Cassinetta (IT); Jerry M. Visin, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,710

(22) Filed: Dec. 13, 2017

(65) Prior Publication Data

US 2018/0100684 A1 Apr. 12, 2018

Related U.S. Application Data

(62) Division of application No. 15/276,104, filed on Sep. 26, 2016, now Pat. No. 9,890,990, which is a division
(Continued)

(51) Int. Cl.
*F25D 23/06* (2006.01)
*F25D 23/02* (2006.01)
(Continued)

(52) U.S. Cl.
CPC ............ *F25D 23/028* (2013.01); *B29C 53/02* (2013.01); *B29D 99/0053* (2013.01); *B32B 3/04* (2013.01);
(Continued)

(58) Field of Classification Search
CPC ........... B32B 3/04; B32B 3/263; B32B 37/18; B32B 37/0076; B32B 38/0012;
(Continued)

(56) References Cited

U.S. PATENT DOCUMENTS 948,541 A 2/1910 Coleman
1,275,511 A 8/1918 Welch
(Continued)

FOREIGN PATENT DOCUMENTS

CA 626838 A 5/1961
CA 1320631 7/1993
(Continued)

OTHER PUBLICATIONS

Kitchen Aid, "Refrigerator User Instructions," 120 pages, published Sep. 5, 2015.
(Continued)

*Primary Examiner* — James O Hansen
(74) *Attorney, Agent, or Firm* — Price Heneveld LLP (57) ABSTRACT

A three-dimensional (3D) vacuum insulation panel (VIP) and a folding approach to create the 3D VIP from a two-dimensional (2D) VIP of non-uniform thickness for a refrigerator, a refrigerator freezer or a non-appliance, are disclosed. The folding approach includes placing a VIP main panel and a plurality of VIP wall panels on an outer film, where one or more panels are of a greater thickness than other VIP panels; placing an inner film on top of the VIP main and wall panels and sealing the films together. The inner film is longer than the outer film and this allows the films and the VIP wall panels to be folded into a finished panel, wherein the longer inner film allows for folding without causing tears or micro-cracks in the film that would adversely affect the insulation properties of the three-dimensional (3D) VIP.

20 Claims, 7 Drawing Sheets

Related U.S. Application Data of application No. 14/634,946, filed on Mar. 2, 2015, now Pat. No. 9,476,633.

(51) Int. Cl.

| | | |
|---|---|---|
| *B32B 3/04* | (2006.01) | |
| *B32B 3/26* | (2006.01) | |
| *B32B 37/00* | (2006.01) | |
| *B32B 37/18* | (2006.01) | |
| *B32B 38/00* | (2006.01) | |
| *B32B 38/18* | (2006.01) | |
| *B29C 53/02* | (2006.01) | |
| *B29D 99/00* | (2010.01) | |
| *E06B 3/70* | (2006.01) | |
| *E06B 7/23* | (2006.01) | |

(52) U.S. Cl.
CPC .......... *B32B 3/263* (2013.01); *B32B 37/0076* (2013.01); *B32B 37/18* (2013.01); *B32B 38/0012* (2013.01); *B32B 38/1808* (2013.01); *E06B 3/7015* (2013.01); *E06B 7/2305* (2013.01); *F25D 23/06* (2013.01); *B32B 2038/0028* (2013.01); *B32B 2307/304* (2013.01); *B32B 2509/10* (2013.01); *B32B 2607/00* (2013.01); *E06B 2003/7051* (2013.01); *F25D 2201/10* (2013.01); *F25D 2201/14* (2013.01); *Y02B 40/34* (2013.01)

(58) Field of Classification Search
CPC ... B32B 38/1808; F25D 23/028; F25D 23/06; B29C 53/02; B29D 99/0053; E06B 3/7015; E06B 7/2305
USPC .............. 312/400, 401, 406; 428/68, 69, 76; 220/592.1, 592.09
See application file for complete search history.

(56) References Cited

U.S. PATENT DOCUMENTS

| | | |
|---|---|---|
| 1,849,369 A | 3/1932 | Frost |
| 1,921,576 A | 8/1933 | Muffly |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,729,863 A | 1/1956 | Kurtz |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Constantini et al. |
| 3,137,900 A | 6/1964 | Carbary |
| 3,218,111 A | 11/1965 | Steiner |
| 3,258,883 A | 7/1966 | Companaro et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherburn |
| 4,114,065 A * | 9/1978 | Horvay .................. F25D 21/04 220/592.1 |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick et al. |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,681,788 A | 7/1987 | Barito et al. |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr et al. |
| 4,914,341 A | 4/1990 | Weaver et al. |
| 4,917,841 A | 4/1990 | Jenkins |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,287 A | 3/1996 | Henderson |

(56) References Cited

U.S. PATENT DOCUMENTS

| | | |
|---|---|---|
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,716,581 A | 2/1998 | Tirrell et al. |
| 5,768,837 A | 6/1998 | Sjoholm |
| 5,792,801 A | 8/1998 | Tsuda et al. |
| 5,813,454 A | 9/1998 | Potter |
| 5,826,780 A | 10/1998 | Neeser et al. |
| 5,827,385 A | 10/1998 | Meyer et al. |
| 5,834,126 A | 11/1998 | Sheu |
| 5,843,353 A | 12/1998 | DeVos et al. |
| 5,866,228 A | 2/1999 | Awata |
| 5,866,247 A | 2/1999 | Klatt et al. |
| 5,868,890 A | 2/1999 | Fredrick |
| 5,900,299 A | 5/1999 | Wynne |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,164,739 A | 12/2000 | Schulz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,266,970 B1 | 7/2001 | Nam et al. |
| 6,294,595 B1 | 9/2001 | Tyagi et al. |
| 6,305,768 B1 | 10/2001 | Nishimoto |
| 6,485,122 B2 | 1/2002 | Wolf et al. |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,623,413 B1 | 9/2003 | Wynne |
| 6,629,429 B1 | 10/2003 | Kawamura et al. |
| 6,651,444 B2 | 11/2003 | Morimoto et al. |
| 6,655,766 B2 | 12/2003 | Hodges |
| 6,689,840 B2 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 6,997,530 B2 | 2/2006 | Avendano et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,278,279 B2 | 10/2007 | Hirai et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,386,992 B2 | 6/2008 | Adamski et al. |
| 7,449,227 B2 | 11/2008 | Echigoya et al. |
| 7,475,562 B2 | 1/2009 | Jackovin |
| 7,517,031 B2 | 4/2009 | Laible |
| 7,517,576 B2 | 4/2009 | Echigoya et al. |
| 7,537,817 B2 | 5/2009 | Tsunetsugu et al. |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,905,614 B2 | 3/2011 | Aoki |
| 7,908,873 B1 | 3/2011 | Cur et al. |
| 7,930,892 B1 | 4/2011 | Vonderhaar |
| 7,938,148 B2 | 5/2011 | Carlier et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,545 B2 | 10/2012 | Chen et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,439,460 B2 | 5/2013 | Laible et al. |
| 8,453,476 B2 | 6/2013 | Kendall et al. |
| 8,456,040 B2 | 6/2013 | Allard et al. |
| 8,491,070 B2 | 7/2013 | Davis et al. |
| 8,516,845 B2 | 8/2013 | Wuesthoff et al. |
| 8,522,563 B2 | 9/2013 | Allard et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,726,690 B2 | 5/2014 | Cur et al. |
| 8,733,123 B2 | 5/2014 | Adamski et al. |
| 8,739,567 B2 | 6/2014 | Junge |
| 8,739,568 B2 | 6/2014 | Allard et al. |
| 8,752,918 B2 | 6/2014 | Kang |
| 8,752,921 B2 | 6/2014 | Gorz et al. |

(56) References Cited

U.S. PATENT DOCUMENTS

| | | |
|---|---|---|
| 8,756,952 B2 | 6/2014 | Adamski et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,790,477 B2 | 7/2014 | Tenra et al. |
| 8,840,204 B2 | 9/2014 | Bauer et al. |
| 8,852,708 B2 | 10/2014 | Kim et al. |
| 8,871,323 B2 | 10/2014 | Kim et al. |
| 8,881,398 B2 | 10/2014 | Hanley et al. |
| 8,899,068 B2 | 12/2014 | Jung et al. |
| 8,905,503 B2 | 12/2014 | Sahasrabudhe et al. |
| 8,927,084 B2 | 1/2015 | Jeon et al. |
| 8,943,770 B2 | 2/2015 | Sanders et al. |
| 8,944,541 B2 | 2/2015 | Allard et al. |
| 8,986,483 B2 | 3/2015 | Cur et al. |
| 9,009,969 B2 | 4/2015 | Choi et al. |
| RE45,501 E | 5/2015 | Maguire |
| 9,056,952 B2 | 6/2015 | Eilbracht et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,252,570 B2 | 2/2016 | Allard et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0088685 A1* | 4/2006 | Echigoya ............... F16L 59/065 428/69 |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0206464 A1 | 8/2010 | Heo et al. |
| 2010/0218543 A1 | 9/2010 | Duchame |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horil et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCracken |
| 2012/0240612 A1 | 9/2012 | Wusthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0270732 A1 | 10/2013 | Wu et al. |
| 2013/0285527 A1 | 10/2013 | Choi et al. |

(56) References Cited

U.S. PATENT DOCUMENTS

| | | |
|---|---|---|
| 2013/0293080 A1 | 11/2013 | Kim et al. |
| 2013/0305535 A1 | 11/2013 | Cur et al. |
| 2013/0328472 A1 | 12/2013 | Shim et al. |
| 2014/0009055 A1 | 1/2014 | Cho et al. |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0260332 A1 | 9/2014 | Wu |
| 2014/0346942 A1 | 11/2014 | Kim et al. |
| 2014/0364527 A1 | 12/2014 | Matthias et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0027628 A1 | 1/2015 | Cravens et al. |
| 2015/0059399 A1 | 3/2015 | Hwang et al. |
| 2015/0115790 A1 | 4/2015 | Ogg |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0176086 A1 | 6/2017 | Kang |
| 2017/0184339 A1 | 6/2017 | Liu et al. |
| 2017/0191746 A1 | 7/2017 | Seo |

FOREIGN PATENT DOCUMENTS

| | | |
|---|---|---|
| CA | 2259665 | 1/1998 |
| CA | 2640006 | 8/2007 |
| CN | 1158509 | 7/2004 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 5/2012 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115221 | 12/2015 |
| CN | 2014963379 U | 1/2016 |
| DE | 1150190 | 6/1963 |
| DE | 4110292 A1 | 10/1992 |
| DE | 4409091 | 9/1995 |
| DE | 19818890 | 11/1999 |
| DE | 19914105 | 9/2000 |
| DE | 19915311 | 10/2000 |
| DE | 102008026528 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0260699 | 3/1988 |
| EP | 0480451 | 4/1992 |
| EP | 0645576 A1 | 3/1995 |
| EP | 0691518 | 1/1996 |
| EP | 0860669 | 8/1998 |
| EP | 1087186 | 3/2001 |
| EP | 1200785 | 5/2002 |
| EP | 1243880 | 9/2002 |
| EP | 1496322 | 1/2005 |
| EP | 1505359 | 2/2005 |
| EP | 1602425 A1 | 12/2005 |
| EP | 1624263 A2 | 8/2006 |
| EP | 1484563 | 10/2008 |
| EP | 2342511 | 8/2012 |
| EP | 2543942 | 1/2013 |
| EP | 2543942 A2 | 1/2013 |
| EP | 2607073 | 6/2013 |
| EP | 2789951 | 10/2014 |
| EP | 2878427 A1 | 6/2015 |
| FR | 2980963 | 4/2013 |
| FR | 2991698 A1 | 12/2013 |
| GB | 837929 | 6/1960 |
| GB | 1214548 | 6/1960 |
| JP | 4828353 | 8/1973 |
| JP | 51057777 | 5/1976 |
| JP | 59191588 | 12/1984 |
| JP | 03013779 | 1/1991 |
| JP | 404165197 | 6/1992 |
| JP | 04165197 | 10/1992 |
| JP | 04309778 A | 11/1992 |
| JP | 06159922 | 6/1994 |
| JP | 7001479 | 1/1995 |
| JP | H07167377 | 7/1995 |
| JP | 08300052 | 11/1996 |
| JP | H08303686 | 11/1996 |
| JP | H09166271 | 6/1997 |
| JP | 10113983 | 5/1998 |
| JP | 11159693 A | 6/1999 |
| JP | 11311395 | 11/1999 |
| JP | 11336990 | 12/1999 |
| JP | 2000097390 | 4/2000 |
| JP | 2000117334 | 4/2000 |
| JP | 2000320958 | 11/2000 |
| JP | 2000320958 A | 11/2000 |
| JP | 2001038188 | 2/2001 |
| JP | 2001116437 | 4/2001 |
| JP | 2001336691 | 12/2001 |
| JP | 2001343176 | 12/2001 |
| JP | 2002068853 | 3/2002 |
| JP | 3438948 | 8/2003 |
| JP | 03478771 | 12/2003 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 2006077792 | 3/2006 |
| JP | 2006161834 A | 6/2006 |
| JP | 2006161945 | 6/2006 |
| JP | 03792801 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 04545126 B2 | 9/2010 |

(56) References Cited

FOREIGN PATENT DOCUMENTS

| | | |
|---|---|---|
| JP | 2010236770 | 10/2010 |
| JP | 2010276309 | 12/2010 |
| JP | 2011002033 | 1/2011 |
| JP | 2011069612 | 4/2011 |
| JP | 04779684 | 9/2011 |
| JP | 2011196644 | 10/2011 |
| JP | 2012026493 | 2/2012 |
| JP | 04897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 | 3/2013 |
| JP | 2013050267 A | 3/2013 |
| JP | 2013076471 | 4/2013 |
| JP | 2013076471 A | 4/2013 |
| JP | 2013088036 | 5/2013 |
| JP | 2013195009 | 9/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 1020080103845 | 11/2008 |
| KR | 20090026045 | 3/2009 |
| KR | 1017776 | 2/2011 |
| KR | 20120007241 | 1/2012 |
| KR | 2012046621 | 5/2012 |
| KR | 2012051305 | 5/2012 |
| KR | 20150089495 A | 8/2015 |
| RU | 547614 | 5/1977 |
| RU | 2061925 C1 | 6/1996 |
| RU | 2077411 C1 | 4/1997 |
| RU | 2081858 | 6/1997 |
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 | 6/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 648780 A1 | 2/1979 |
| SU | 01307186 A1 | 4/1987 |
| WO | 9614207 A1 | 5/1996 |
| WO | 9721767 | 6/1997 |
| WO | 1998049506 | 11/1998 |
| WO | 02060576 A1 | 4/1999 |
| WO | 9614207 A1 | 4/1999 |
| WO | 9920961 A1 | 4/1999 |
| WO | 9920964 A1 | 4/1999 |
| WO | 199920964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 03089729 | 10/2003 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2010007783 A1 | 1/2012 |
| WO | 2012023705 | 2/2012 |
| WO | 2012026715 | 3/2012 |
| WO | 2012031885 | 3/2012 |
| WO | 2012044001 | 4/2012 |
| WO | 2012043990 | 5/2012 |
| WO | 2012085212 | 6/2012 |
| WO | 2012119892 | 9/2012 |
| WO | 2012152646 | 11/2012 |
| WO | 2013116103 | 8/2013 |
| WO | 2013116302 | 8/2013 |
| WO | 2014038150 | 3/2014 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

Cai et al., "Generation of Metal Nanoparticles by Laser Ablation of Microspheres," J. Aerosol Sci., vol. 29, No. 5/6 (1998), pp. 627-636.

Raszewski et al., "Methods for Producing Hollow Glass Microspheres," Powerpoint, cached from Google, Jul. 2009, 6 pages.

BASF, "Balindur™ Solutions for fixing Vaccum Insulated Panels," web page, 4 pages, date unknown, http://performance-materials.basf.us/products/view/family/balindur, at least as early as Dec. 21, 2015.

BASF, "Balindur™," web page, 2 pages, date unknown, http://product-finder.basf.com/group/corporate/product-finder/en/brand/BALINDUR, at least as early as Dec. 21, 2015.

PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.

* cited by examiner

3D VACUUM PANEL AND A FOLDING APPROACH TO CREATE THE 3D VACUUM PANEL FROM A 2D VACUUM PANEL OF NON-UNIFORM THICKNESS

CROSS-REFERENCE TO RELATED APPLICATIONS

The present application is a divisional of U.S. patent application Ser. No. 15/276,104, filed Sep. 26, 2016, entitled 3D VACUUM PANEL AND A FOLDING APPROACH TO CREATE THE 3D VACUUM PANEL FROM A 2D VACUUM PANEL OF NON-UNIFORM THICKNESS, which is divisional of U.S. patent application Ser. No. 14/634,946 filed Mar. 2, 2015, entitled 3D VACUUM PANEL AND A FOLDING APPROACH TO CREATE THE 3D VACUUM PANEL FROM A 2D VACUUM PANEL OF NON-UNIFORM THICKNESS, now U.S. Pat. No. 9,476,633, the entire disclosures of which are hereby incorporated herein by reference.

FIELD OF THE DISCLOSURE

This application relates to a panel or cabinet for refrigeration or non-appliance use, including, but not limited to, an insulated cooler. In particular, the present disclosure relates to a 3D vacuum panel and creating a 3D vacuum panel from a 2D vacuum panel of non-uniform thickness.

BACKGROUND

Various types of insulated cabinet and door insulated structures have been developed for refrigerators, freezers, and other such appliances. Insulated appliance door and cabinet structures may include polyurethane foam, polystyrene or other insulating material that is positioned between an outer door skin or wrapper and an inner door liner. However, known insulated appliance structures may suffer from various drawbacks.

In the related art, vacuum-in-place (VIP) insulation panels are manufactured in a flat 2D shape and are then folded. However, there are drawbacks to this approach. Manufacturing VIP panels in a flat 2D shape limits their application to flat walls and makes it difficult to use as insulation on a surface that is not flat. In some cases, it will be advantageous to have a shape that has some walls that are thicker than others. One solution is to make a 3D core and seal the 3D core in a film having a gas barrier. A drawback to this approach is that it may result in high mechanical stresses in the film that may create tears or holes in the gas barrier which allow air or water vapor to enter the vacuum panel, which can result in air infiltration that defeats the insulation. Thus, there exists a need to overcome these drawbacks in the related art and provide a foldable vacuum insulation panel having sections of different thicknesses.

SUMMARY

An aspect of the present disclosure provides a foldable vacuum insulation panel which consists of sections of different thicknesses. This allows a three-dimensional shape to have walls of different thicknesses after the walls are folded into final form. For example, a French door bottom mount (FDBM) freezer door could be constructed using this method, as could a refrigerator cabinet or a non-appliance. The front wall could be one thickness while the sides could be thicker to match the external metal panel thickness or to include the door dike section. The top piece of the barrier film may be longer than the bottom piece of barrier film in order for it to match the profile of the panel. This would reduce the amount of stretching of the film that would be required to confirm the difference in panel height. Another application of this solution is that the pre-shaped boards are not only different thicknesses, but could also have some three-dimensional features. This would allow, for example, a thicker section to be incorporated to include the door dike or other features that exist in today's polyurethane (PU) foamed doors but would not be possible to incorporate by folding a two-dimensional shape. By having VIP insulation panels that are of different thickness, the VIP insulation panels can replace the PU foamed doors, which is an advantage since the VIP insulation performs better than the PU or polystyrene that would otherwise be used.

An aspect of the present disclosure is generally directed toward a method of manufacturing a 3D VIP insulated door panel from a 2D flat panel of non-uniform thickness, the method including the steps of providing an outer film; providing a flat vacuum-in-place (VIP) main wall on the outer film; providing a VIP top wall on the outer film adjacent to and at an edge of the main wall; providing a VIP bottom wall on the outer film adjacent to the main wall and opposite to the top wall; providing a VIP left wall on the outer film and adjacent to and at an edge of the main wall; providing a VIP right wall on the outer film and adjacent to the main wall and opposite to the left wall, wherein one or more of the VIP top wall, the VIP bottom wall, the VIP left wall and the VIP right wall are thicker than the main wall; providing an inner film on top of the main wall and each of the VIP top wall, VIP bottom wall, VIP left wall and VIP right wall; wherein the inner film is longer than the outer film, sealing the inner and outer films, and providing the inner film in a length wherein folding the VIP top wall, VIP bottom wall, VIP left wall and VIP right wall onto the main wall produces a 3D VIP insulated door panel of non-uniform thickness.

Another aspect of the present disclosure provides a 3D VIP insulated door panel manufactured from a 2D flat panel of non-uniform thickness, 3D VIP insulated door panel including an outer film; a flat vacuum-in-place (VIP) main wall on the outer film; a VIP top wall on the outer film adjacent to and at an edge of the main wall; a VIP bottom wall on the outer film adjacent to the main wall and opposite to the top wall; a VIP left wall on the outer film and adjacent to and at an edge of the main wall; a VIP right wall on the outer film and adjacent to the main wall and opposite to the left wall, wherein one or more of the VIP top wall, the VIP bottom wall, the VIP left wall and the VIP right wall have a different thickness than the main wall; an inner film on top of the main wall and each of the VIP top wall, VIP bottom wall, VIP left wall and VIP right wall; wherein the inner film is longer than the outer film, wherein the inner and outer films are sealed, and the inner film is configured to be of a length wherein folding the VIP top wall, VIP bottom wall, VIP left wall and VIP right wall onto the main wall produces a 3D VIP insulated door panel of non-uniform thickness.

Yet another aspect of the present disclosure provides a refrigerator freezer door assembly, the refrigerator freezer door assembly including a door panel including a door flange on opposite sides of the panel; a top end cap mounted to the top of the door panel between the door flanges; a bottom end cap opposite the top end cap; a folded 3D VIP insulation panel inside the door panel having walls of non-uniform thickness; an inner door liner inside the folded VIP door panel; a gasket surrounding a periphery of the inner door liner; and left and right brackets secured to the inside of the inner door liner.

These and other features, advantages, and objects of the present invention will be further understood and appreciated by those skilled in the art by reference to the following specification, claims, and appended drawings.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessary to scale. Certain features of the invention may be exaggerated in scale or shown in schematic form in the interest of clarity and conciseness.

DETAILED DESCRIPTION OF THE PRESENT DISCLOSURE

Before the subject invention is described further, it is to be understood that the invention is not limited to the particular present disclosure described below, as many variations of the present disclosure may be made and still fall within the scope of the appended claims. It is also to be understood that the terminology employed is for the purpose of describing present disclosure, and is not intended to be limiting in any manner.

In this specification and the appended claims, the singular forms "a," "an" and "the" include plural reference unless the context clearly dictates otherwise. The present disclosure are generally directed toward a 3D vacuum panel and a folding approach to create the 3D vacuum panel from a 2D vacuum panel having a non-uniform thickness.

Figure 1A:
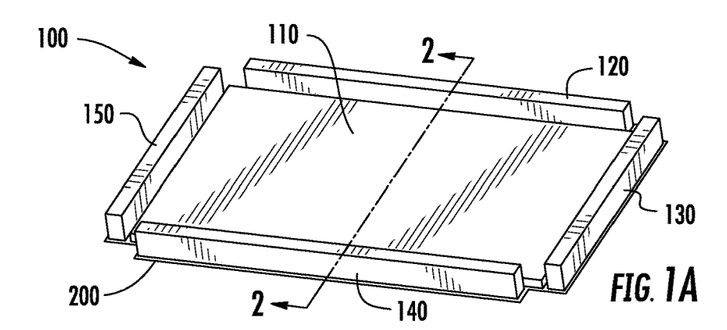
FIG. 1A is a perspective view of an unfolded 3D VIP insulation panel according to an exemplary embodiment.
Figure 1B:
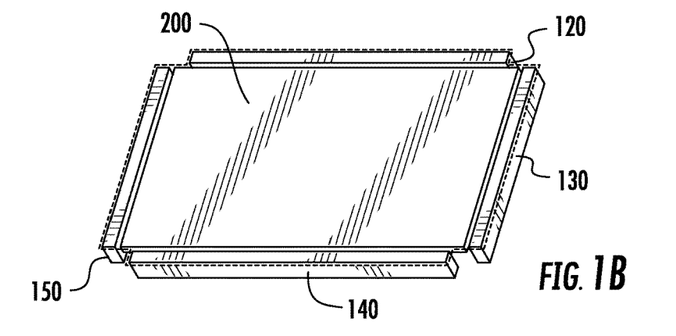
FIG. 1B is a perspective view of the bottom of the unfolded 3D VIP insulation panel of FIG. 1A.
Figure 1C:
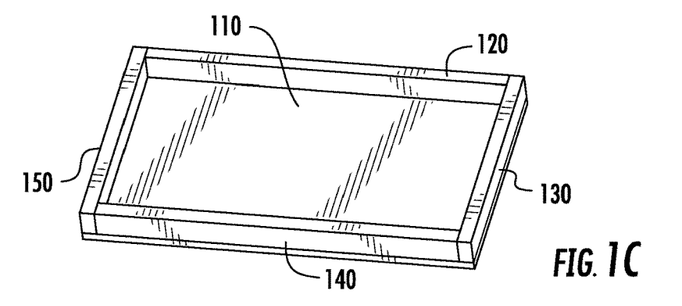
FIG. 1C is a perspective view of the folded 3D VIP insulation panel of FIG. 1A.

For purposes of description herein, The terms "upper," "lower," "right," "left," "rear," "front," "vertical," "horizontal," "top," "bottom," "left," "right" and derivatives thereof shall relate to the disclosure as oriented in FIGS. 1A-1C. However, it is to be understood that the disclosure may assume various alternative orientations, except where expressly specified to the contrary. It is also to be understood that the specific devices and processes illustrated in the attached drawings, and described in the following specification are simply present disclosure of the inventive concepts defined in the appended claims. Hence, specific dimensions and other physical characteristics relating to the present disclosure disclosed herein are not to be considered as limiting, unless the claims expressly state otherwise.

Referring to FIGS. 1A-1C, reference numeral 100 refers to an unfolded main wall and top walls of a vacuum insulation panel (VIP) used in a refrigerator freezer door, but are not limited thereto. The unfolded VIP panel 100 includes main wall 110, top wall 120, right wall 130, and bottom wall 140 which are located opposite to top wall 120, left wall 150 and bottom film 200. In this exemplary embodiment, each of the unfolded walls are adjacent to one another and rest on outer film 200. In addition, the walls, other than the flat main wall 110 are configured to be folded. One or more of the top, bottom, left side and right side VIP walls may be of different thicknesses from each other. Each of the main body 110, and the top, bottom, left and right walls 120-150 rests on a film 200.

FIG. 1B is a rear view of the 3D VIP of FIG. 1A, showing rear film 200 and walls 120, 130, 140 and 150. The main wall 110 is covered by film 200. The walls 110-150 are covered by outer film 200 in this figure.

FIG. 1C is a folded view of a finished 3D VIP. In this aspect of the present disclosure, an inner film 210 has been added on top of walls 110-150 and is sealed to outer film 200 in a conventional manner as would be understood by one of ordinary skill in the art. The walls 120-150 are then folded to form the finished 3D VIP I as shown in FIG. 1C.

Figure 2:
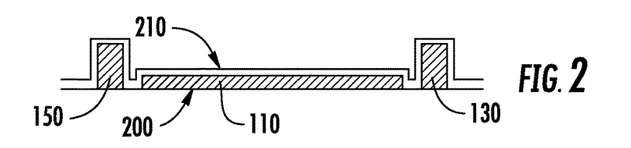
FIG. 2 is a cross-sectional view of FIG. 1A, taken along the lines 2-2 of FIG. 1A.

FIG. 2 is a view which illustrates the inner film 210 placed over the walls 110-150 to be sealed to outer film 200 (only 110, 130 and 150 are shown). The walls 110-150 are then folded, as shown in FIG. 1C, to form the finished 3D VIP for use in a refrigerator freezer assembly. The inner film 210 may be longer than the outer film 200. This permits the walls 120-150 to be folded onto the main wall 110 in such a manner that the longer inner film 210 allows the film to stretch to a point of allowing the product to be finished without tearing or causing micro-cracks, etc., to the film. If there were tears or micro cracks in the film when the seals of the inner and outer films are folded, air could get into the VIP and adversely affect their insulative ability. By making the inner film longer than the outer film, this problem is avoided because the films are not overly stretched to a point of tearing or developing micro-cracks which can adversely affect the insulation properties of the VIP. By making the inner film longer than the outer film, a small gap may be created between the walls of the VIP, which reduces the chance of tears or micro-cracks, and is easier to manufacture. By having the top piece of film longer than the bottom piece of film, the amount of stretching of the film when folding the walls of the VIP is reduced, reducing the chance of tearing or the development of micro-cracks.

Figure 3A:
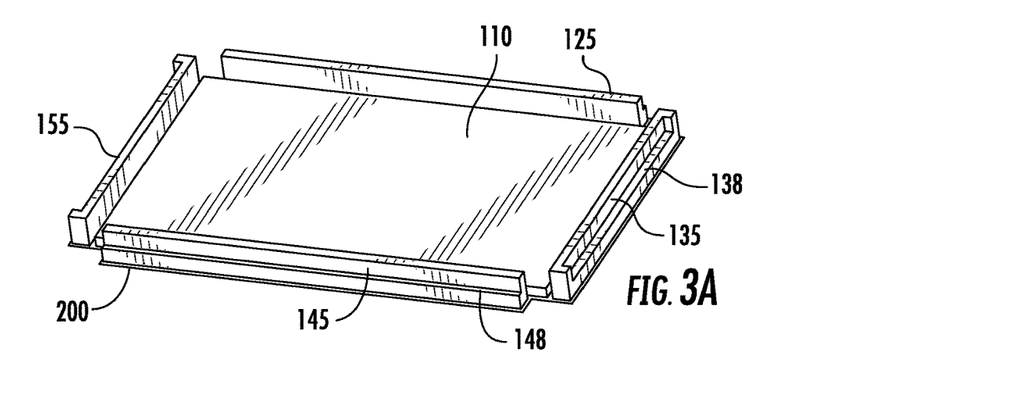
FIG. 3A is a perspective view of an unfolded 3D VIP insulation panel of another exemplary embodiment.

FIG. 3A is a perspective view of an alternate embodiment where the VIP may include sides that are not of uniform cross section and have stepped portions on the walls of the VIP. The stepped portions can be used to mark features of the door so that the door can be thinner in places, resulting in consumers obtaining more space. As shown in FIG. 3A, an unfolded VIP is illustrated. This VIP is similar to FIG. 1A with the exception that the top wall 125, bottom wall 145, left wall 155 and right wall 135 each include a stepped portion. Two stepped portions 138 and 148 are shown. The stepped portions for 125 and 155 are not shown but are the same as stepped portions 138 and 148. The purpose of these stepped portions is to fill a dyke portion of a refrigerator or the dyke portion of a refrigerator freezer.

Figure 3B:
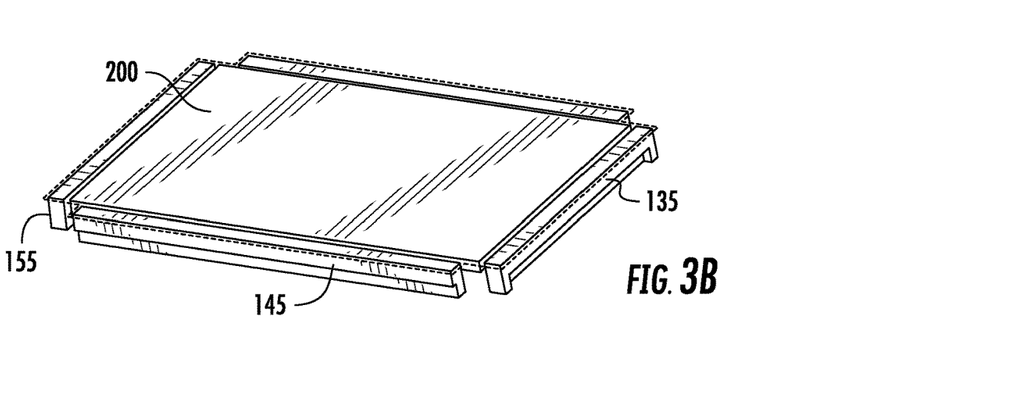
FIG. 3B is a perspective view of the bottom of the unfolded 3D VIP insulation panel of FIG. 3A.

FIG. 3B is a rear perspective view of FIG. 3A. This figure shows film 200 which is located on the underside of main wall 110 and the walls 125, 135, 145 and 155. This figure shows the walls and main wall attached at their undersides to film. Although the film for this exemplary embodiment is shown as being the same size as the film 200 of FIGS. 1A-1C, the size of the film is not limited thereto and may be sized to conform to the size of the main wall 110 and the walls 125, 135, 145 and 155, which are to be folded.

Figure 3C:
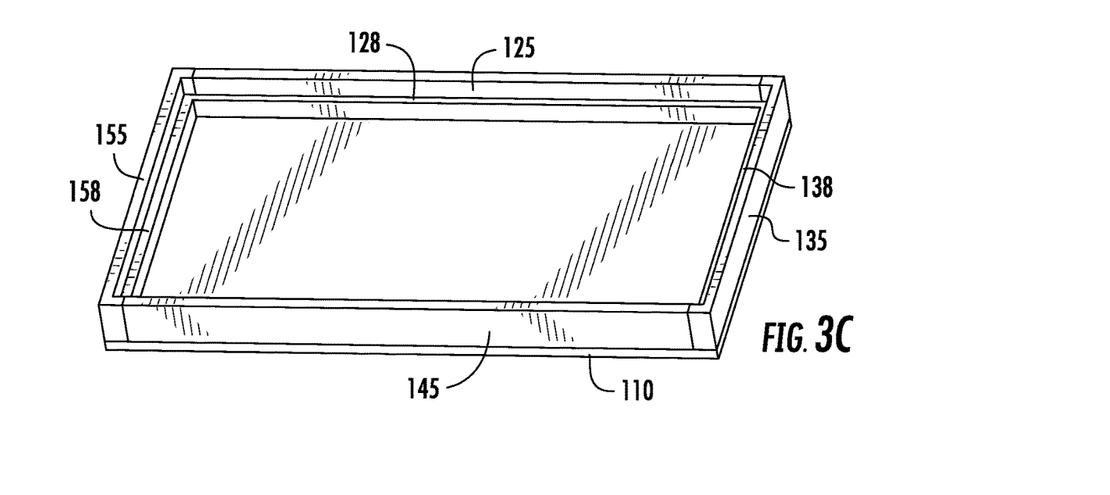
FIG. 3C is a perspective view of the folded 3D VIP insulation panel of FIG. 3A.

FIG. 3C shows a folded VIP. In this embodiment, main wall 110, top wall 125, bottom wall 145, left wall 155 and right wall 135 are all illustrated. In this exemplary embodiment, all of the stepped portions of the walls 125, 135, 145 and 155 are shown to be of the same size and have the same stepped portion. However, the invention is not limited thereto and the walls and stepped portions can be of different sizes and shapes.

Figure 4:
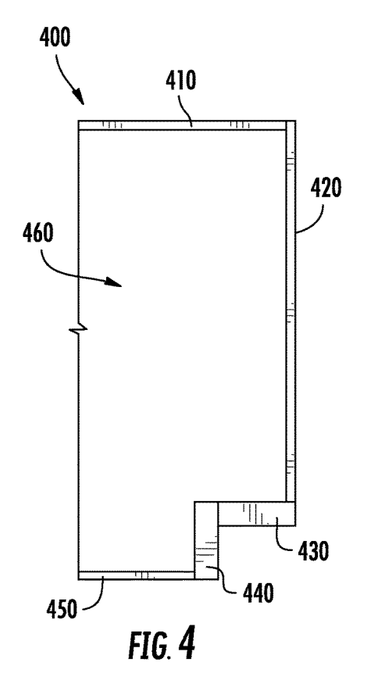
FIG. 4 is a cross sectional view taken along line A-A of FIG. 5 of a folded 3D VIP insulation panel with non-uniform thicknesses according to another exemplary embodiment.
Figure 5:
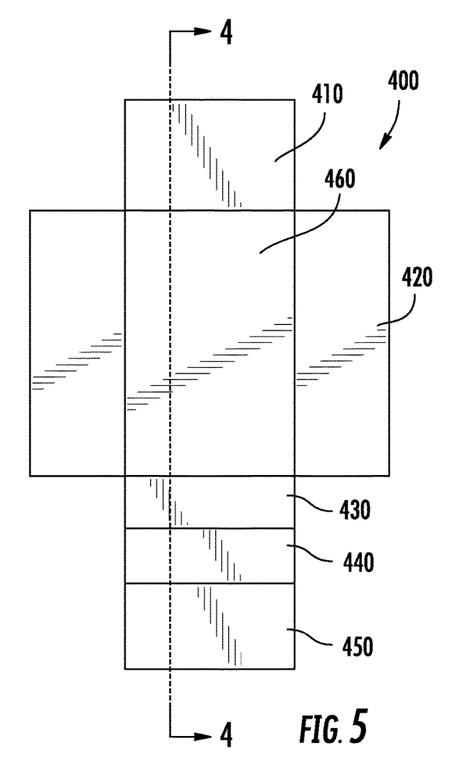
FIG. 5 is an unfolded view of a 2D VIP insulation panel having non-uniform thicknesses.

FIGS. 4 and 5 show an exemplary embodiment having walls of different thicknesses. FIG. 4 is taken along lines 4-4 of FIG. 5. FIG. 4 shows a cutaway of a folded VIP 400. Illustrated is a main wall 460. Top wall 410 and right wall 420 are also shown. Bottom corner walls 430 and 440 are of a greater thickness than top wall 410, bottom wall 450, and right wall 420. Walls 430 and 440 are made thicker in the exemplary embodiment to provide an area of greater insulation to provide better insulation to a compressor, etc.

FIG. 5 is an unfolded blank of a VIP that is folded to make the VIP of FIG. 4. In this exemplary embodiment, thicker walls 430 and 440 are shown to be adjacent to main wall 460. In this exemplary embodiment, films 200 and 210 are not illustrated but may be the same type of films found in the embodiments of FIGS. 1A-1C, FIG. 2 and FIG. 3A-3C.

Figure 6:
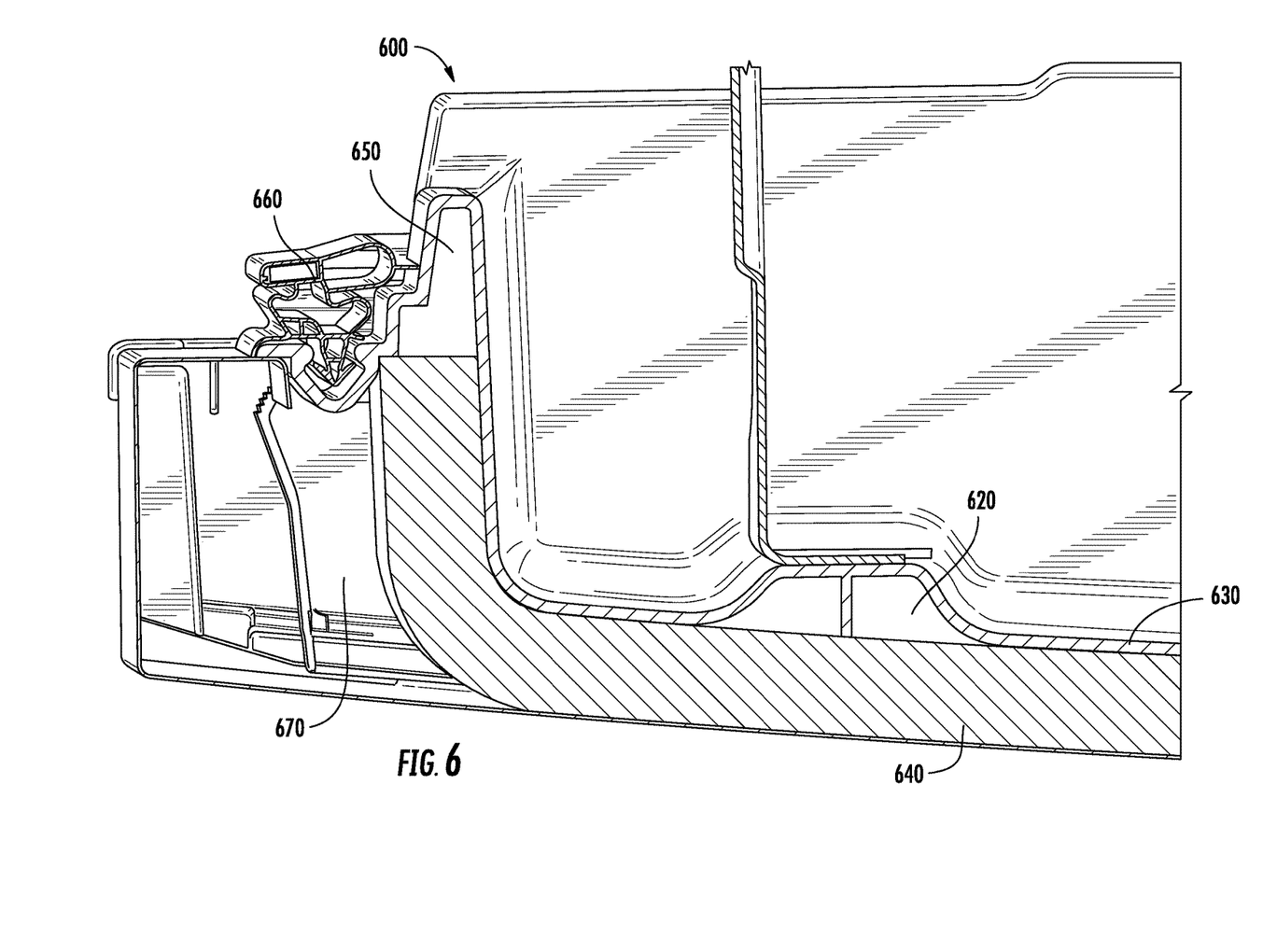
FIG. 6 is a cross sectional view of a refrigerator freezer door having a folded 3D VIP insulation panel according to another exemplary.
Figure 7:
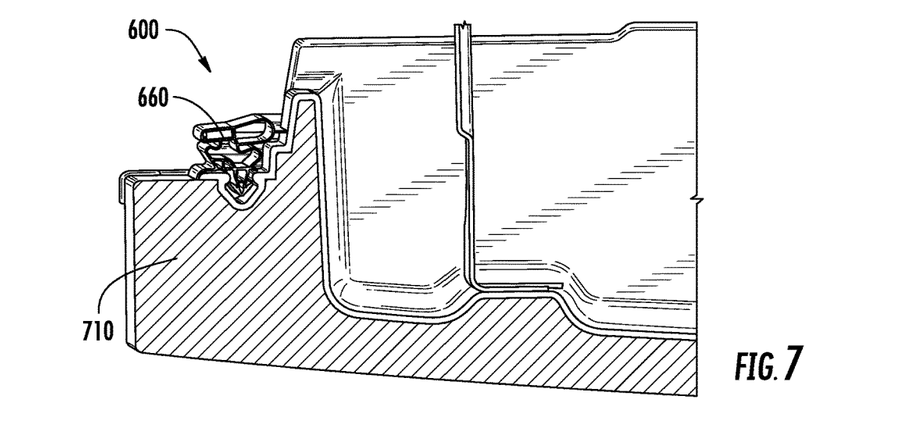
FIG. 7 is a cross sectional view of a refrigerator freezer door having a 3D folded VIP insulation panel according to an exemplary embodiment.

FIG. 6 illustrates an exemplary embodiment of a refrigerator or refrigerator freezer door. In this exemplary embodiment, 620 is an area where a door bracket is attached. Area 620 may be unfilled (air), but may also be filled with an insulation material, including, but not limited to EPS or PU. Reference number 630 is part of a door liner. Reference number 640 is a folded VIP that extends across the door panel 600 and then turns upwardly. As shown, VIP 640 does not extend into the door dyke 650 and does not extend into area 670, which is usually filled with polyurethane (PU) or polystyrene. Gasket assembly 660 is shown in the area usually filled with PU or polystyrene. In this exemplary embodiment, the door dyke 650 may be left empty (air filled) or may be filled with PU or polystyrene, which provide rigidity. A door dyke is the part of the door that goes into the refrigerator and keeps air from getting to the gasket. It is important to keep the cold air away from the gaskets so as to minimize heat transfer through the gasket. FIG. 7 is an illustration of a door panel of a refrigerator or a refrigerator freezer. This exemplary embodiment is similar to the exemplary embodiment of FIG. 6. A difference is that in this exemplary embodiment, the VIP extends across the door liner and upwardly towards the door dyke, represented as 650 in FIG. 6. In this exemplary embodiment, the VIP additionally fills three areas. The first is that the VIP fills the area where a bracket assembly attaches to the inner liner, i.e., the area represented by 620 in FIG. 6. Secondly, the VIP fills the area of the door dyke that would, in the related art, be filled with PU, polystyrene or air. The door dyke is represented by 650 in FIG. 6. The third area is the area 710 where the area would, in the related art, be filled with PU or polystyrene or left empty, i.e., filled with air. A problem with leaving an area filled with air is that if pushed or squeezed, there is no support. During a manufacturing process, the area 710 may be formed similar to a wall 150 in FIG. 2 and folded into place. In this exemplary embodiment, a refrigerator or refrigerator freezer door is illustrated; however, the invention is not limited thereto and the VIP could be formed into the shape of all or part of a refrigerator appliance or a non-appliance, and used as an insulative component to build an entire refrigerator cabinet or a portion of a refrigerator cabinet or a non-appliance including, but limited to an insulated cooler.

Figure 8:
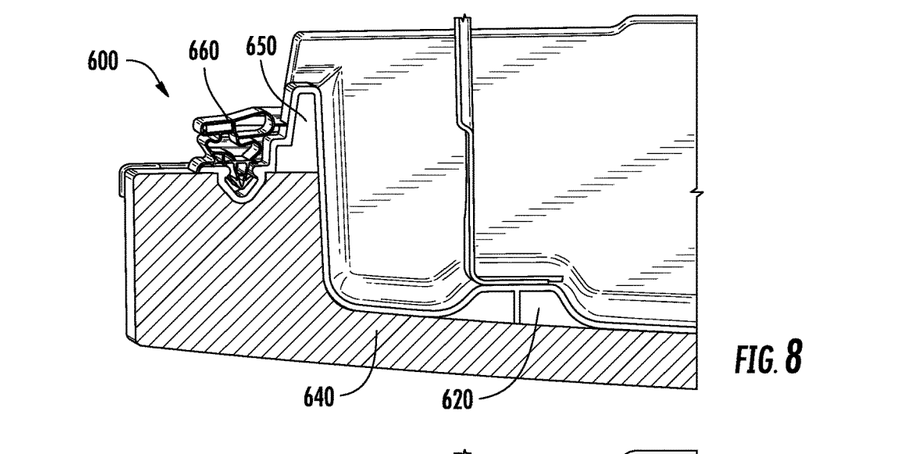
FIG. 8 is a cross sectional view of a refrigerator freezer door having a 3D VIP insulation panel according to another exemplary embodiment.

Turning next to FIG. 8, portion 640 may be filled with a VIP. In this exemplary embodiment, the area of the door dyke 650 is not filled and the area 620 where the bracket assembly meets the inner liner is not filled with a VIP. Rather, these sections not filled with VIP may be filled with PU, polystyrene, or air, but is not limited thereto, as would be understood by one of ordinary skill in the art. In the manufacture of the exemplary embodiment of FIG. 8, the VIP 640 may be formed similar to the main wall 110 and left wall 150 of FIG. 2, and folded into place.

Figure 9:
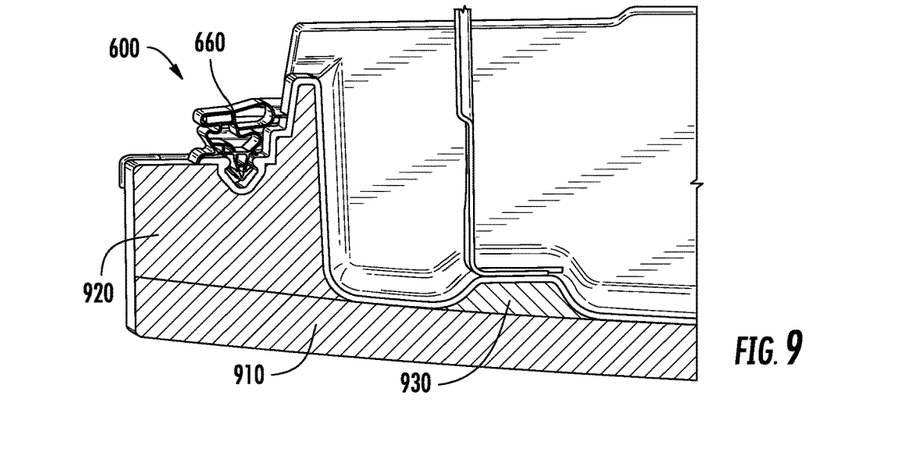
FIG. 9 is a cross sectional view of a refrigerator freezer door having a 3D VIP insulation panel according to another exemplary embodiment.

Turning next to FIG. 9, a flat VIP 910 is provided across the door assembly. 910 is a main wall and 920 is a side wall. The area of the door dyke 650 (FIG. 6) and the gasket assembly 660 are filled by VIP 920 and the area where the bracket meets the inner liner may be filled with a different VIP 930. However, area 930 may be filled with air, PU, EPS, etc., as would be understood by an artisan. This area is referred to by 620 in FIG. 6. In manufacturing the exemplary embodiment of FIG. 9, both VIP 910 and 920 may be formed of sections having an inner and/or outer envelope, or film, which are folded 180° into place, instead of being folded 90° into place, as in FIG. 1.

Figure 10:
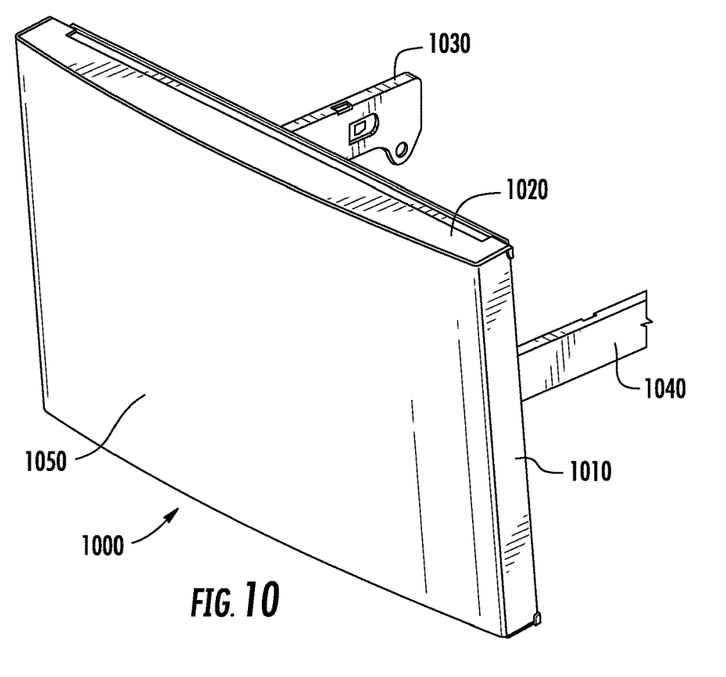
FIG. 10 is a perspective view of a refrigerator freezer door assembly according to an exemplary embodiment.

Turning to FIG. 10, this exemplary embodiment illustrates a perspective view of an assembled refrigerator freezer door assembly 1000. At the outside of the freezer door assembly is a door panel or outer liner 1050. The side edges of the door panel 1050 are labeled as 1010. Also shown in FIG. 10 is a top end cap 1020. A lower end cap is not seen in this figure. In addition, protruding from the back of the door panel 1050 is a pair of mounting brackets. Specifically, left mounting bracket is represented by 1030 and right mounting bracket 1040. The mounting brackets are mounted to the freezer by screws in a manner that would be understood by one of ordinary skill in the art, and will not be described herein.

Figure 11:
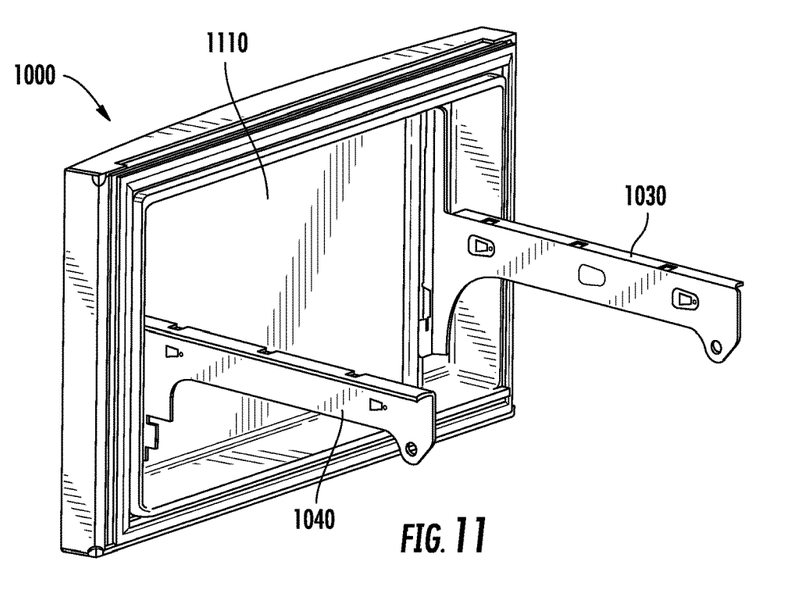
FIG. 11 is a rear perspective view of the refrigerator freezer door assembly of FIG. 10.

FIG. 11 is a rear view of the perspective view of the refrigerator freezer door illustrated in FIG. 10. This figure illustrates a rear surface 1110 of an inner door liner 1270 (FIG. 12), as well as the left and right mounting brackets 1030 and 1040, respectively.

Figure 12:
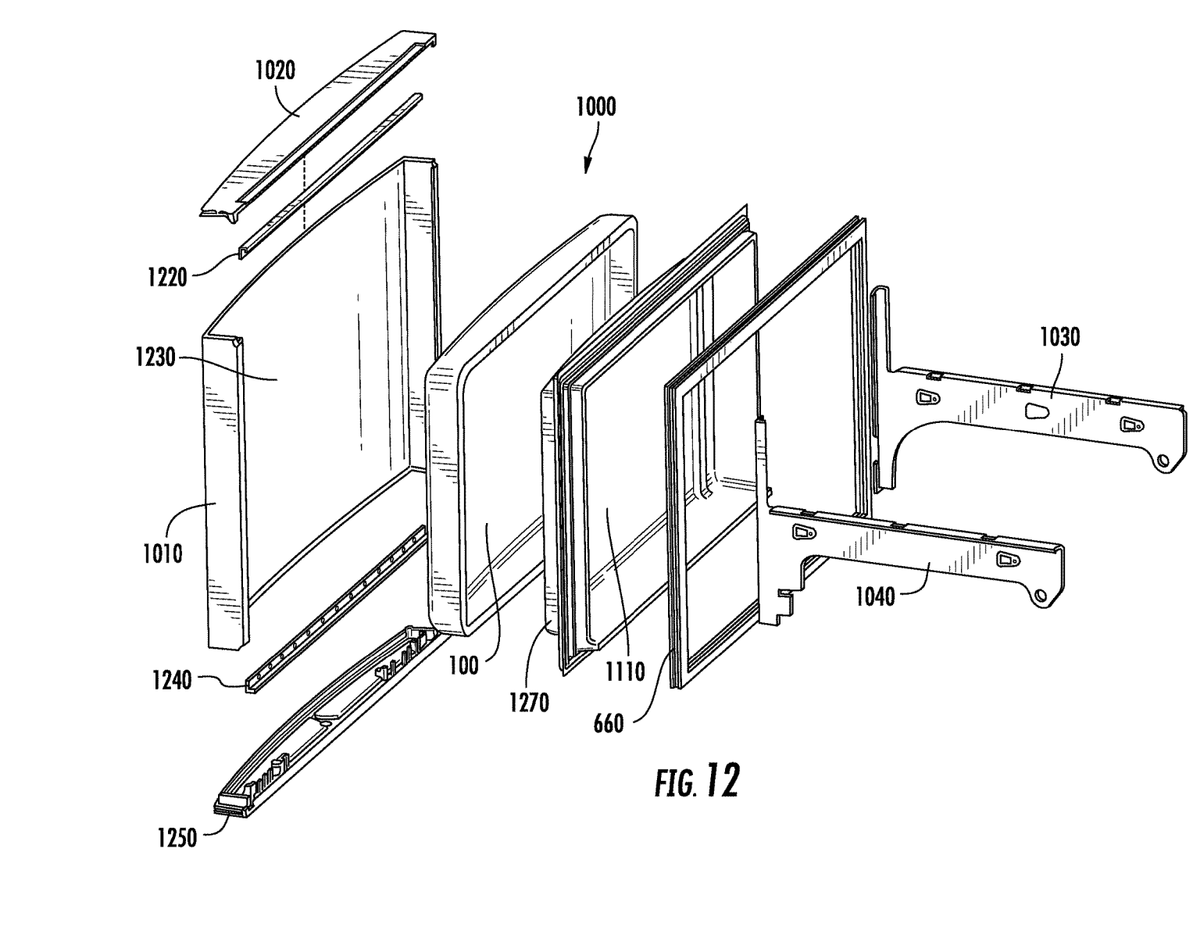
FIG. 12 is an exploded view of the refrigerator freezer door of FIG. 11.

FIG. 12 is an exploded view of the refrigerator freezer door assembly 1000 of FIG. 11. This exemplary embodiment includes a door panel 1050 (FIG. 10) having an inner surface 1230. The side edges of the door panel 1230 are folded inwardly at 1010. Above the door panel is a seal 1220 and a top end cap 1020. At the bottom of the door panel 1050 is a bracket 1240 as well as a bottom end cap 1250. Inside the rear surface 1230 of the door panel assembly is a folded VIP I 100. In this illustration, the VIP may be the same or similar to the VIP insulation panel of FIG. 1C. Inside of the VIP is an inner door liner 1270 having a rear inner surface 1110. On the inside of the inner door liner 1270 is a (100) 660 which surrounds the perimeter of the inner door liner 1270. Mounted to the rear surface 1110 of the inner door liner 1270 is a left mounting bracket 1030 and a right mounting bracket 1040.

Although the above description has described and illustrated various present disclosure, the present disclosure is merely exemplary by nature and is not to be construed as limiting of the inventive concept. Rather, the inventive concept of the disclosed present disclosure is defined by the claimed subject matter.

The invention claimed is:

1. A method of manufacturing a three-dimensional vacuum insulation panel from a flat panel of non-uniform thickness, the method comprising steps of:
    providing an outer film;
    providing a flat main wall on the outer film;
    providing a top wall on the outer film adjacent to and at an outer edge of the main wall;
    providing a bottom wall on the outer film adjacent to the main wall and opposite to the top wall;
    providing a left wall on the outer film and adjacent to and at the outer edge of the main wall;
    providing a right wall on the outer film and adjacent to the main wall and opposite to the left wall, wherein at least one of the top, bottom, left and right walls is thicker than the main wall;
    providing an inner film on top of the main wall and each of the top, bottom, left and right walls, wherein the inner film is longer than the outer film;
    sealing the inner and outer films; and
    folding the top, bottom, left and right walls onto the main wall to produce a vacuum insulated panel of non-uniform thickness.

2. The method of claim 1, wherein the step of folding the top, bottom, left and right walls onto the main wall to produce the vacuum insulated panel includes providing excess material in a film structure defined by the inner and outer films, wherein the excess material of the film structure provides for an at least partial overlap of the film structure at areas of non-uniform thickness that prevents at least one of tears and micro-cracks in the film structure.

3. The method of claim 1, wherein the inner film being longer than the outer film provides for manipulation of the inner film in response to the top, bottom, left and right walls being folded without one of tearing and creating micro cracks in a film structure defined by the inner and outer films that are sealed together.

4. The method of claim 1, further including the step of providing two additional walls of greater thickness than the main, top, bottom, left and right walls, wherein the two additional walls are adjacent to the right wall, wherein the step of folding the top, bottom, left and right walls places the two additional walls at right angles with one another.

5. The method of claim 4, wherein the two additional walls of greater thickness than the main, top, bottom, left and right walls are disposed proximate a compressor of an appliance.

6. The method of claim 1, wherein the vacuum insulated panel is disposed proximate an interior space defined by an appliance.

7. The method of claim 1, wherein the vacuum insulated panel is disposed within a door panel of an appliance.

8. The method of claim 7, wherein the top, bottom, left and right walls define side edges of the door panel.

9. A method of manufacturing a three-dimensional vacuum insulation panel:
    disposing a main wall on an outer film;
    disposing a top wall and a bottom wall on the outer film and adjacent to the main wall, the top wall located opposite to the bottom wall; disposing a left wall and a right wall on the outer film and adjacent to the main wall, the left wall located opposite to the right wall, wherein at least one of the top, bottom, left and right walls is thicker than the main wall;
    disposing an inner film on top of the main wall, the top wall, the bottom wall, the left wall and the right wall;
    sealing the inner and outer films; and
    folding the top wall, bottom wall, left wall and right wall onto the main wall to produce a vacuum insulated panel of non-uniform thickness.

10. The method of claim 9, further comprising steps of:
    disposing the vacuum insulated panel of non-uniform thickness between an inner liner and an outer wrapper; and
    disposing a gasket proximate a periphery of the inner liner.

11. The method of claim 10, wherein a door dyke is positioned proximate the gasket, wherein the door dyke defines a thermal barrier between the inner liner and the gasket.

12. The method of claim 11, wherein the vacuum insulated panel at least partially occupies the door dyke.

13. The method of claim 9, wherein the step of folding the top wall, bottom wall, left wall and right wall onto the main wall to produce a vacuum insulated panel includes providing excess material in a film structure defined by the inner and outer films, wherein the excess material of the film structure provides for an at least partial overlap of the film structure at areas of non-uniform thickness that prevents at least one of tears and micro-cracks in the film structure.

14. The method of claim 9, wherein the inner film is larger than the outer film and provides for manipulation of the inner film in response to the top wall, bottom wall, left wall and right wall being folded without one of tearing and creating micro cracks in a film structure defined by the inner and outer films that are sealed together.

15. The method of claim 9, further including the step of providing two additional walls of greater thickness than the main, top, bottom, left and right walls, wherein the two additional walls are adjacent to the right wall, wherein the step of folding the top, bottom, left and right walls places the two additional walls at right angles with one another.

16. The method of claim 15, wherein the two additional walls of greater thickness than the main, top, bottom, left and right walls are disposed proximate a compressor of an appliance.

17. A method of manufacturing a door panel having a three-dimensional vacuum insulation panel:
    disposing a main wall, top wall, bottom wall, left wall and right wall between inner and outer films, wherein the top, bottom, right and left walls are positioned at respective sides of the main wall;

sealing the inner and outer films together, wherein at least one of the top, bottom, right and left walls is thicker than the main wall;

folding the top, bottom, left and right walls onto the main wall to produce a vacuum insulated panel of non-uniform thickness;

disposing the vacuum insulated panel of non-uniform thickness within an insulating cavity defined between an inner liner and an outer wrapper, wherein a door dyke is defined within the insulating cavity proximate the inner liner and the vacuum insulated panel.

18. The method of claim 17, wherein a gasket is disposed proximate a periphery of the inner liner and proximate the door dyke.

19. The method of claim 18, wherein the door dyke defines a thermal barrier between the inner liner and the gasket.

20. The method of claim 17, wherein the vacuum insulated panel at least partially occupies the door dyke.

* * * * *